Sept. 19, 1933.  M. H. LEMAIRE  1,927,178
APPARATUS FOR THE LEVELING OF RAILWAYS
Original Filed Dec. 13, 1928  2 Sheets-Sheet 1
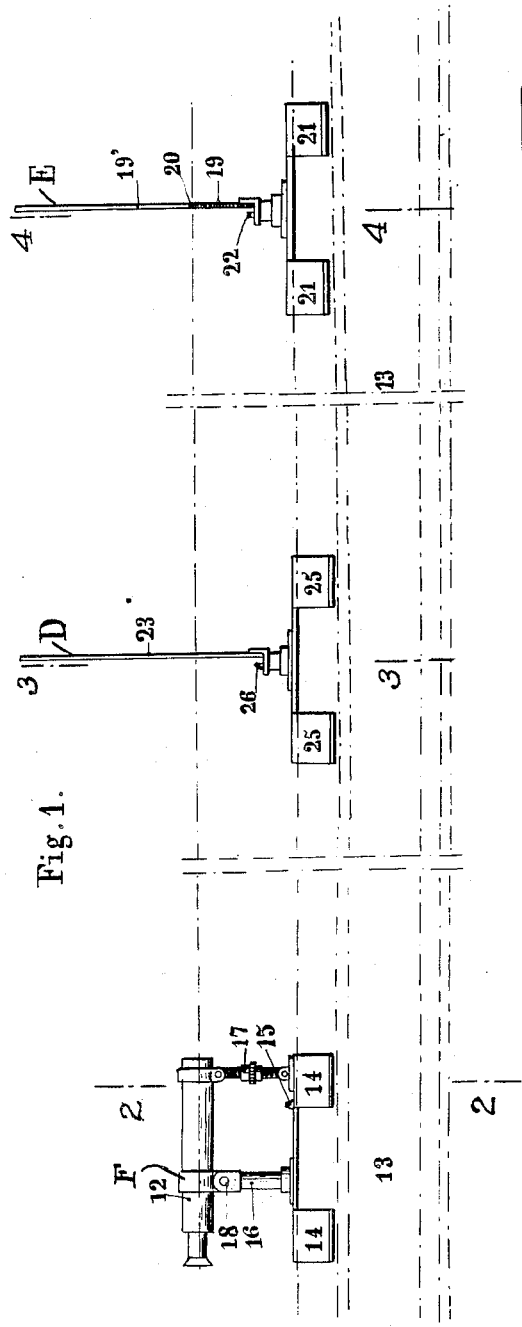
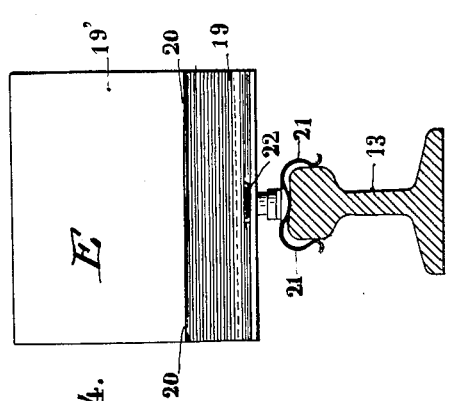
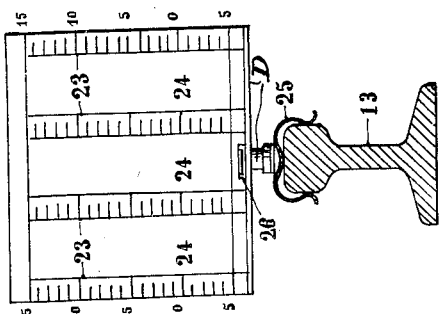
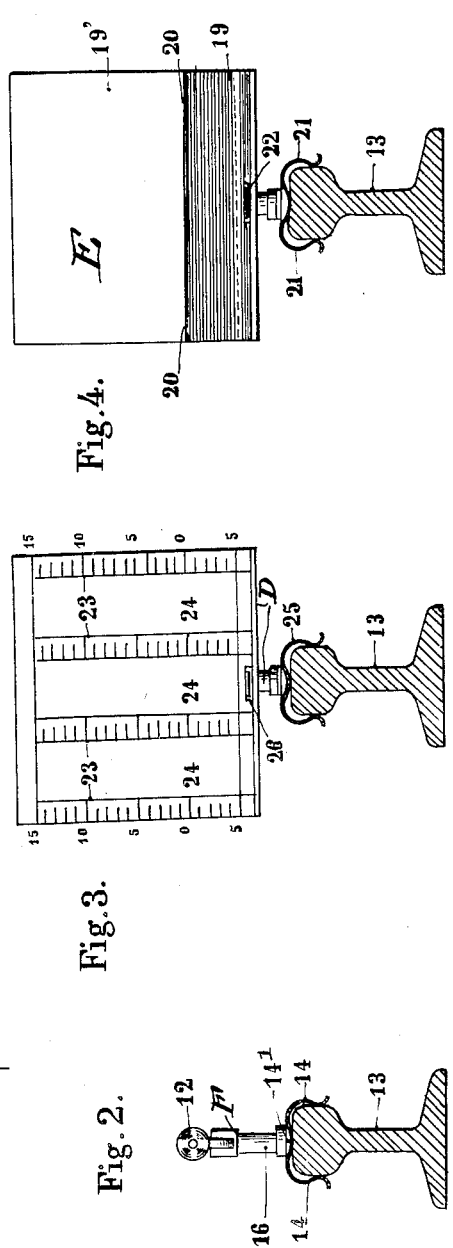
INVENTOR
Maurice Henri Lemaire
by
Attorney Sept. 19, 1933.  M. H. LEMAIRE  1,927,178
APPARATUS FOR THE LEVELING OF RAILWAYS
Original Filed Dec. 13, 1928   2 Sheets-Sheet 2

INVENTOR
Maurice Henri Lemaire
by
Attorney

Patented Sept. 19, 1933

1,927,178

UNITED STATES PATENT OFFICE 1,927,178

APPARATUS FOR THE LEVELING OF RAILWAYS

Maurice Henri Lemaire, Ermont, France

Original application December 13, 1928, Serial No. 325,838, and in France December 13, 1927. Divided and this application June 3, 1930. Serial No. 459,028

4 Claims. (Cl. 33—60)

This invention relates to an apparatus for leveling the tracks of railways and more particularly to an apparatus for determining the permanent sinking or giving way of the track, i. e. the departure of the tracks from the desired level while said tracks are under no load.

The proper maintenance of a railway requires periodic inspection and arrangement of the ballast so that the track will be maintained properly level. An apparatus for measuring the momentary movement under load of the sleepers with respect to the ballast is disclosed in my application Serial No. 325,838 filed December 13th, 1928 while this divisional application relates to apparatus for determining the permanent displacement of the track from the desired level under no load conditions and has been divided from aforesaid application.

Heretofore the apparatus used for determining the no load displacement of a rail have been inadequate, and give no accurate indications as to the necessary readjustment of the ballast.

The primary object of the invention is the provision of a measuring apparatus which will accurately and readily indicate the permanent displacement of the track. Other secondary objects will suggest themselves to those skilled in the art as the disclosure of the invention proceeds.

The apparatus according to the invention consists of a sighting apparatus comprising a reticulated leveling telescope pivotally carried on its support or post, clamping means on said support or post and adjusting means permitting a ready adjustment of said telescope both in a vertical and in a substantially horizontal plane and a sight board comprising a plurality of parallel graduated vertical rods or scales unitarily connected.

It may comprise also a second sight-board or target used in connection with the reticule of the telescope for determining the horizontal serving as basis for the measurements made with the graduated sight-board.

Reference is made to the accompanying drawings forming a part of the disclosure wherein similar reference numerals refer to similar parts and wherein an embodiment comprising said two mentioned sight-boards is shown:

Figure 1 illustrates an elevation of the apparatus of the invention in position on a section of rail.

Figures 2, 3 and 4 are transverse cross-sections of the rail on the lines 2—2, 3—3 and 4—4 of Fig. 1, showing the telescope or sighting device, the graduated sight, and the target, respectively, as viewed along the axis of the rail.

Figure 5:
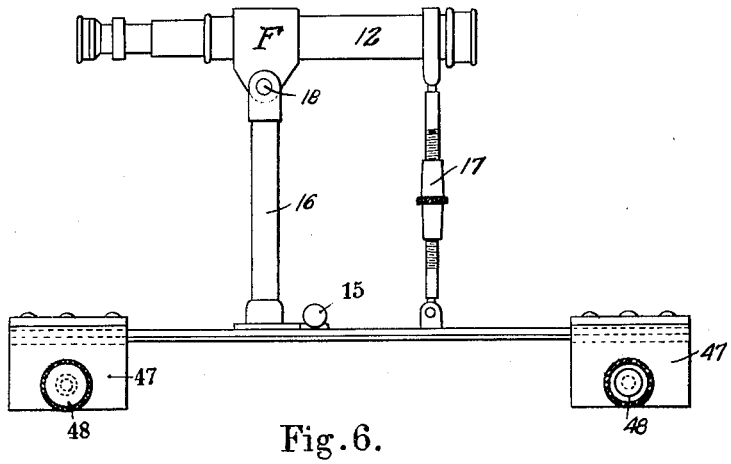
Figure 5 illustrates in elevation at a larger scale the sighting apparatus provided with clamps.

The sighting device F is constituted by a telescope 12 having as a reticule a horizontal wire. The telescope is fixed on the rail 13, in a position parallel with the axis of the latter by means of a support with elastic jaws 14 which bear upon the side faces of the head of the rail. Each jaw has a rounded central portion $14^1$ (Fig. 2) which remains in contact with the top of the rails.

A leveling device 15 of any suitable kind arranged across the rail, indicates when the optical axis of telescope 12 is in the vertical plane passing through the axis of the rail. The bent elastic ends of the jaws 14 allow adjustment of telescope 12 by slightly swivelling it around the rail head until the optical axis thereof is in said vertical plane. The body of telescope 12 is pivotally mounted on a support 16. A set screw 17 permits slight angular movement of telescope 12 about its pivot 18 in order to adjust the telescope optical axis in the vertical plane which has just been defined.

The sight board or target E is constituted by a rectangular screen of sheet metal 19, $19^1$ having two superposed fields of different colours (blue and white for example) separated by a horizontal line 20—20 (see Figure 4). The screen is carried by a support having jaws 21 similar to that of the telescope.

By construction the screen is perpendicular to the axis of the support. A level 22 permits the line 20—20, separating the colours, 19, 19′ to be brought into an absolutely horizontal position. To this end its suffices to cause the target to swivel slightly around the rail without the rounded central portion of the jaws leaving the tread of the rail 13.

The vertical distance separating the horizontal line 20—20 from the tread of the rail is equal by construction to the vertical distance separating the optical axis of the telescope from the tread of the rail, thus when the two apparata are placed in vertical position on the rail as has just been described, the telescope being trained on the target, the horizontal line of the reticule covers the image of the horizontal line 20 of the target E.

The graduated sight-board D constitutes an intermediate openwork used for measuring the vertical permanent displacement of the rail with respect to the line of sight determined by the reticule of the telescope and the line 20 of the target at any intermediary point between the telescope and the target. It comprises several graduated vertical rods 23, (four in number for example) which are unitarily connected and are separated by rectangular open spaces 24. These rods are united in a plane perpendicular to the axis of the rail when the said sight is placed in position thereon through the medium of a support with jaws 25 similar to those previously described. A level 26 indicates when the rods 23 are in vertical position which may be effected by swivelling the sight on the rail.

The graduations of the sight D have the desirable extent on either side of the zero line. This zero line is on the line of sight which passes through the sighting line 20—20 and the optical axis of the telescope 12, when the three points of support of the three appliances, (telescope, target and graduated open-work sight) are on a level track.

To carry out a measurement with this leveling apparatus the mode of procedure is as follows:

The sighting device E and target F are placed on the track 13 at two points at a suitable distance from each other and at level portions of the track. The openwork sight D is placed between them over that sleeper or section of the track to be checked. The devices D, E and F are each brought into the vertical plane by proper adjustment on the rails and observation of the levels 26, 22 and 15, respectively. The optical axis of telescope 12 is adjusted by regulating screw 17 about the pivot 18 in a vertical plane until said optical axis coincides with the line 20—20 of the target E, thus establishing a line of sight parallel to the axis of rail 13. A reading, for example in millimeters, is then made on openwork sight D and indicates the vertical permanent displacement of rail 13 and the sleeper adjacent sight D.

Figure 6:
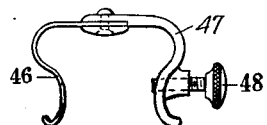
Figure 6 is an end view of one of said clamps.

Figures 5 and 6 illustrate a modification of the clamps for securing the support of the telescope on a rail.

Each of these clamps has a resilient part 46 riveted to a rigid part 47 provided with an adjusting screw 48.

As is known, the sighting apparatus is arranged in accordance with the indications given by the leveling device 15, so that the sighting plane of the telescope is vertical and that the sightings are effected with a reticulus perfectly horizontal.

When it is intended to use the above described devices embodying the invention for ascertaining the rail levels upon curves in a track, the sighting operations are effected by adjusting the telescope to proper orientation after placing the same in position on one rail 13 of the track, in combination with one of the graduated scales 23 of the open-work sight D, which is of course, also properly disposed upon the rail and held by its clamp 25.

Due to the fact that the telescope is provided with two clamps 47, it is possible to horizontally orientate or shift the vertical sighting plane of the telescope by adjusting one of the two screws 48 so that this plane will correspond with a chord of the curve in the rail. When this adjustment has been performed, it will be found that the width of the open-work sight D provides for taking measurements without further adjusting the telescope in reference to various desired points located on the curve between the telescope F and the screen E. Thus, displacement of said sight D successively, to one after another of said points, the target or screen E being of course disposed at one end of the chord under consideration enables the displacement of the track to be accurately checked.

Owing to the duality of the clamps 46, 47, it is possible, by acting in the suitable direction on one of the screws 48, to orientate the vertical sighting plane of the telescope according to the desired chord of the curve. When this adjustment is done, the width of the openwork graduated sight D permits making measurements, without further adjusting the telescope, concerning any point located on the curve between the telescope F and the screen E, merely by displacing the sight D successively in each of said points, the solid screen or target E being arranged at the end of the chord.

In these conditions, the number of settings of the telescope are reduced to the minimum.

Figure 7:
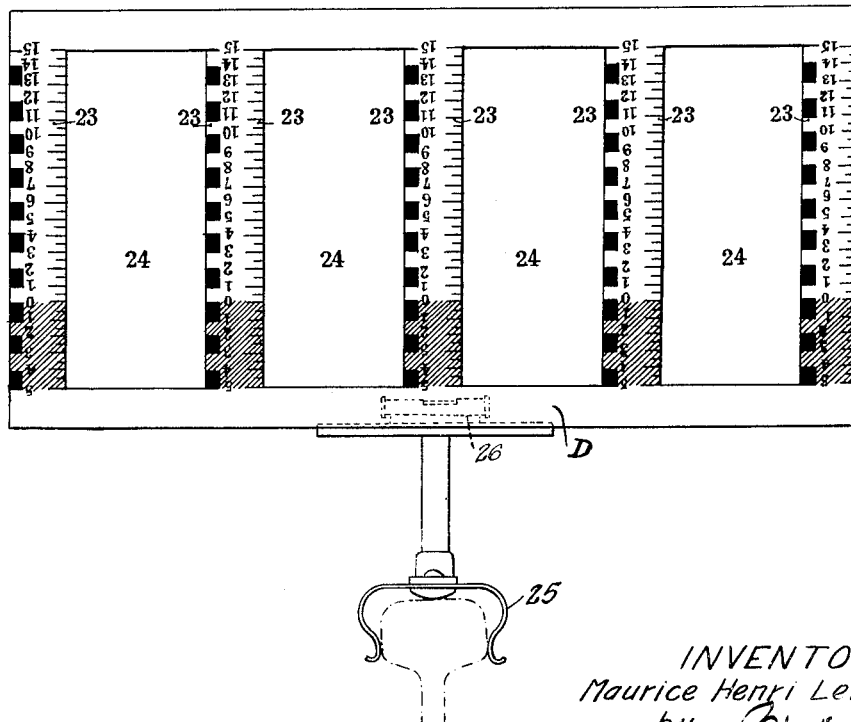
Figure 7 is a front view of the graduated sight.

The openwork sight shown in Figure 7 has five vertical graduations 23 and four rectangular openwork spaces 24. The digits of the graduations are inverted in order to be read without difficulty in the telescope.

Each graduation is divided by the zero in two portions one extending upward, the other extending downward, the first one gives the positive corrections and the other the negative corrections. To avoid any error on the part of the observer, the second portion, in the example shown in the drawings will be painted in red, so that, if the reading takes place for instance in the red portion, the correction is negative.

In certain cases, instead of using the target E for determining the desired position of the optical axis of the telescope, the line of zeros of the sight D may be used, instead of the line 20 of the target E, for the said purpose.

Having now particularly described my invention what I desire to protect by Letters Patent and what I claim is:

1. Apparatus for measuring the permanent vertical displacement of a railroad track, comprising the combination, with a sighting means which comprises a reticulated leveling telescope, of a base pivotally supporting said telescope and having clamping means providing for the ready clamping in position of said telescope on a rail of said track at a level point thereof and adjusting means upon said base providing for a ready adjustment of the inclination and orientation of the optical axis of said telescope with respect to the axis of said rail, a sight board comprising a plurality of unitarily connected graduated rods or scales, and means for supporting said board upon a rail and clamping it thereto, said means allowing a ready adjustment of said scales to a vertical position on said rail.

2. Apparatus for measuring the permanent vertical displacement of a railroad track, including the combination, with a telescope and a target which are adapted to be removably spaced apart along one rail of said track, of a leveling device adapted to be removably placed upon said rail between said telescope and said target and having a plurality of graduated vertical scales permanently disposed in spaced parallel relation to form a group, and means supporting said telescope on the rail, for orientation of the optical axis of said telescope in a horizontal plane with respect to the axis of said rail, so that for any outline of said rail, at least one of the vertical scales of said leveling device is within the optical field of said telescope when sighting said target.

3. Apparatus for measuring the permanent vertical displacement of a railroad track, including the combination, with a telescope and a target which are adapted to be removably spaced apart along one rail of said track, of a leveling device adapted to be removably placed upon said rail between said telescope and said target, including a frame having a plurality of graduated vertical scales permanently secured thereto in equidistantly spaced parallelism and corresponding with different axes with respect to said rail, and means supporting said telescope on the rail, for orientation of the optical axis of said telescope in a horizontal plane with respect to the axis of said rail, so that for any outline of said rail, at least one of the vertical scales of said leveling device is within the optical field of said telescope when sighting said target.

4. Apparatus according to claim 2 wherein the telescope supporting means includes a base, clamps thereon having jaws adapted to embrace a rail, one jaw of each clamp being resilient and its opposed jaw being relatively rigid, an adjustment screw in each rigid jaw adapted to abut the head of a rail and provide for orientation of the telescope in a horizontal plane, a vertical rod mounted upon said base, hinged members disposed upon the upper portion of said rod directly supporting said telescope and providing for oscillation of the latter upon a horizontal axis, and adjustment means connected both to said base and to said telescope for altering the inclination of the telescope at will upon said horizontal axis.

MAURICE HENRI LEMAIRE.